Figure 1:
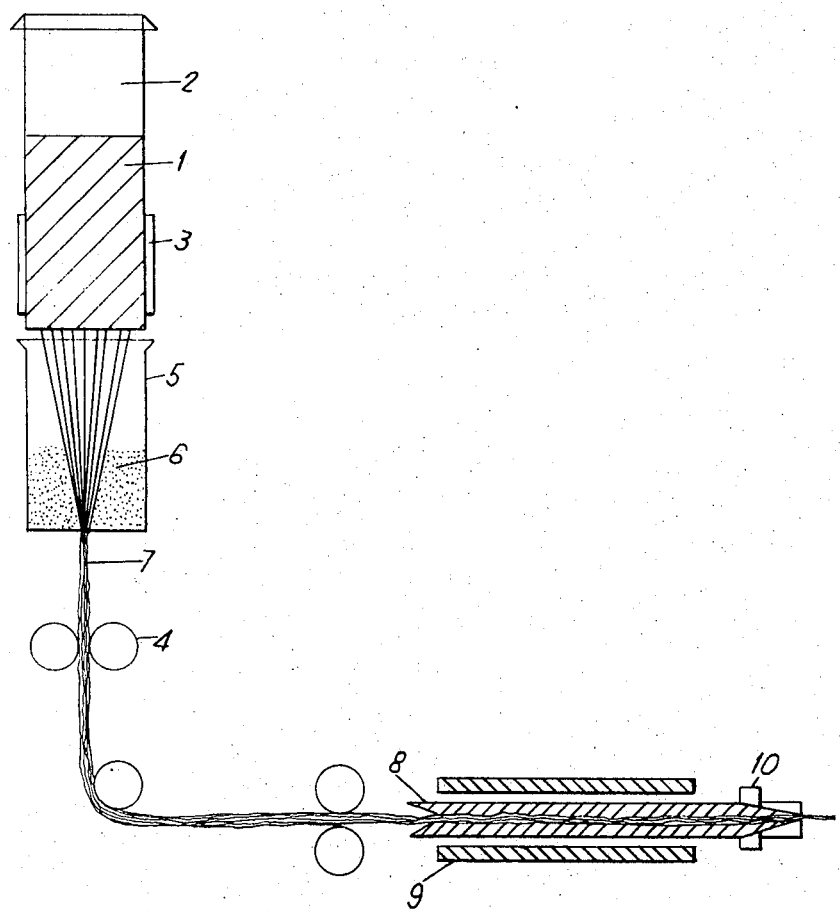

United States Patent
Davis

[11] 3,862,287
[45] Jan. 21, 1975

[54] PRODUCTION OF FIBRE REINFORCED THERMOPLASTIC MATERIALS

[75] Inventor: John Howard Davis, Hertford, England

[73] Assignee: Imperial Chemical Industries Limited, London, England

[22] Filed: May 26, 1972

[21] Appl. No.: 257,083

[30] Foreign Application Priority Data
June 10, 1971 Great Britain.................... 19889/71

[52] U.S. Cl...... 264/131, 117/126 GB, 117/DIG. 6, 156/167, 156/180, 156/283, 264/134, 264/DIG. 51
[51] Int. Cl............................................. B29b 1/00
[58] Field of Search ........... 156/167, 180, 283, 296, 156/321, 322; 117/DIG. 6, 126 GB; 118/DIG. 5; 264/131, 134, DIG. 51

[56] References Cited
UNITED STATES PATENTS

| | | | |
|---|---|---|---|
| 2,694,661 | 11/1954 | Meyer | 156/441 |
| 2,938,821 | 5/1960 | Nack | 156/167 |
| 3,083,550 | 4/1963 | Averbach | 156/167 |
| 3,220,905 | 11/1965 | Doob, Jr. et al. | 156/296 |
| 3,234,596 | 2/1966 | Sims | 264/DIG. 51 |
| 3,425,862 | 2/1969 | Eakins | 117/126 GB |
| 3,507,251 | 4/1970 | Thayer et al. | 118/425 |
| 3,586,560 | 6/1971 | Stranch et al. | 156/167 |
| 3,673,027 | 6/1972 | Spencer | 156/180 |
| 3,702,276 | 11/1972 | Ward, Jr. | 156/167 |
| 3,742,106 | 6/1973 | Price | 156/167 |

Primary Examiner—Daniel J. Fritsch
Attorney, Agent, or Firm—Cushman, Darby & Cushman

[57] ABSTRACT

Extruding a plurality of fibres, passing the fibres into a bed of a powdered thermoplastic, causing the fibres to converge while they are in the bed so that they form an impregnated bundle, and heating the bundle to a temperature above the melting point of the thermoplastic so that the thermoplastic flows to produce a matrix around the fibres. The bed of powdered thermoplastic is preferably fluidised.

6 Claims, 2 Drawing Figures

PRODUCTION OF FIBRE REINFORCED THERMOPLASTIC MATERIALS

The present invention relates to a process for the production of fibre reinforced synthetic thermoplastic materials and to moulding materials produced therefrom.

Reinforced thermoplastic materials are generally produced by compounding a reinforcing material and a thermoplastic material together on, for example, a two roll mill or in an extruder and then comminuting the crepe or extrudate thus obtained to produce granules which are subsequently moulded to form the desired articles. However, cheap reinforcing fibres, particularly glass fibres are often supplied as continuous rovings consisting of several groups of filaments. It is difficult to produce satisfactory moulding granules from these rovings because thermoplastic material cannot be adequately distributed throughout the roving to ensure an acceptable dispersion of the glass in the subsequently moulded product without a long and severe moulding operation. One method of overcoming this problem has been described in our copending application No. 127,302 now U.S. Pat. No. 3,742,106 and published as French Pat. No. 2,085,896. This method comprises passing a roving through a bed of powdered thermoplastic material and, while the roving is in said bed, separating the rovings into bundles each consisting of one or more filaments and subsequently heating the roving impregnated with the powdered thermoplastic to above the melting point of the thermoplastic. This method results in an excellent dispersion of the glass in the subsequently moulded thermoplastic. The impregnated roving may subsequently be chopped up into moulding granules if desired or may be fed to a heated profile die to produce a fibre reinforced thermoplastic section.

The present invention is also directed towards the production of fibre reinforced thermoplastic materials having an excellent dispersion of the reinforcing material in the thermoplastic material but achieves this result in a different way to that described in our copending application now published as French Pat. No. 2,085,896.

Thus according to the present invention we provide a process for the production of fibre reinforced thermoplastic material comprising extruding a plurality of fibres, passing the fibres into a bed of powdered thermoplastic material of lower melting point than the fibrous material, causing the fibres to converge while they are in the bed so that they form a bundle which is impregnated with the thermoplastic powder, and heating the impregnated bundle to a temperature above the melting point of the thermoplastic but below the melting point of the fibres.

Preferably the impregnated bundle is passed through a die while it is at a temperature above the melting point of the thermoplastic material.

In the process of our invention, the particles of the thermoplastic powder impinge and become attached to the, preferably still separate, filaments of the reinforcing material that are being extruded. The particles of the powdered thermoplastic also become lodged between the filaments and remain lodged therebetween after the fibres have converged to form a bundle. In this way the bundle becomes well impregnated with the thermoplastic material and the impregnated fibre bundle is then heated to above the melting point of the thermoplastic material (but below the melting point of the fibre) so that the fibres become embedded in a matrix of the thermoplastic.

In the process of our invention it is advantageous that the bed of thermoplastic powder be fluidised while the reinforcing fibres are being passed through it. It is also advantageous that the fibres are still hot while they pass through the bed of thermoplastic powder as this causes the thermoplastic powder particles striking or contacting the fibres to tackify or melt to a certain extent, depending on the temperature of the fibres at the contacting instant, thereby allowing the particles to impinge more securely to the fibres.

The preferred method of performing our invention is to begin to draw the extruded fibres together immediately after they have left the die of the extruder or spinneret and to subject the fibres to the thermoplastic powder, which is preferably fluidised, at any convenient position between the die of the extruder and the point where the fibres have been completely drawn together.

By the term "thermoplastic material" we mean a material which when heated to above its melting point will flow to form a homogeneous mass. The powdered thermoplastic material we prefer to use is a particulate material of weight average particle size less than 1500 microns. We especially prefer to use material of between 100 and 500 microns weight average particle size, although it is often useful to include a small quantity of powder of particle size with an average well outside this range. Examples of suitable thermoplastics which may be used include polymers and copolymers of $\alpha$-olefines, such as high and low density polyethylene, polypropylene, polybutene, poly-4-methyl pentene-1, propylene-/ethylene copolymers, copolymers of 4-methyl pentene-1 with linear $\alpha$-olefines containing 4 to 18 carbon atoms, and ethylene/vinyl acetate copolymers; polymers and copolymers of vinyl chloride, vinyl acetate, vinyl butyral, styrene, substituted styrenes such as $\alpha$-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2-ethyl hexyl acrylate, alkyl fumarates, alkyl vinyl ethers, such as cetyl vinyl ether, thermoplastic polyimide precursors; polyvinyl acetate; polyvinyl butyral; polystyrene; styrene/acrylonitrile copolymers; polyacrylonitrile; copolymers of butadiene with methyl methacrylate and/or styrene and optionally acrylonitrile; polymethyl methacrylate; copolymers of methyl methacrylate with minor amounts of alkyl acrylates such as methyl acrylate, ethyl acrylate and butyl acrylate; copolymers of methyl methacrylate, and vinylidene chloride/acrylonitrile copolymers; melt processable copolymers of tetra-fluoroethylene and hexafluoropropylene.

Halogenated polymers or copolymers may be used; for example halogenated $\alpha$-olefine polymers, such as chlorinated polyethylene, or halogenated vinyl chloride polymers such as chlorinated polyvinyl chloride.

Other thermoplastic polymers that may be used include condensation polymers such as linear polyesters such as polyethylene terephthalate; polyamides such as polycaprolactam, polyhexamethylene adipamide and copolyamides such as copolymers of hexamethylene diamine adipate and hexamethylene diamine isophthalate, particularly those containing from 5 to 15% by weight of hexamethylene diamine isophthalate; polysulphones and copolysulphones, polyphenylene oxides; polycarbonates; thermoplastic polymers and copolymers of formaldehyde; thermoplastic linear polyurethanes; and the thermoplastic derivatives of cellulose such as cellulose acetate, cellulose nitrate and cellulose butyrate.

Where a copolymer is used, the amounts of the co-monomers that are used in the various copolymers will depend, inter alia, on the particular application or applications envisaged.

Blends of these thermoplastic resins may also be used.

Additives such as stabilisers, lubricants, processing aids, plasticisers, dyes, pigments, impact modifiers and fillers may be incorporated into the thermoplastic used to achieve a desired appearance, property or combination of properties.

The fibrous reinforcing material may be any suitable material which may be conveniently extruded into continuous fibres. For example, the reinforcing material may be glass or it may be a fibre forming thermoplastic such as polyamide or a polyester. However, it is to be understood that the melting point of the reinforcing fibrous material must be higher than that of the thermoplastic particulate material so that it does not melt when the thermoplastic particulate material is heated to above its melting point. Other reinforcing materials that may be used include thin metal wires.

When the reinforcing fibrous material is glass it may first be coated with a finish such as a silane before passing it through the fluidised bed of the thermoplastic powder. This improves the bond between the glass and the thermoplastic. Additionally it may be coated with a size or suitable film former such as starch, polyvinyl alcohol or polyvinyl acetate to protect the fibres from abrasion. The thermoplastic particulate material may also contain a coupling agent to improve the bond between the glass and the thermoplastic resin.

In the cases where fluidised beds are employed any suitable gas may be used to fluidise the polymer bed. Suitable gases include air, nitrogen, carbon dioxide, or inert gases such as helium or argon.

The extruded fibres and the bed of particulate thermoplastic material may be completely blanketted in an atmosphere of a non-reactive gas such as nitrogen or an inert gas which will of course conveniently be the fluidising gas for the thermoplastic powder in the cases where fluidised beds are employed.

After passage through the bed of thermoplastic powder the impregnated bundle of fibres is heated to a temperature above the melting point of the thermoplastic so that the polymer flows to form a matrix in which the fibres are embedded. Conveniently the bundle of fibres is heated by passage through a heated tube incorporating a forming die at the end where the bundle emerges. It is sometimes preferable to water cool the die in order to achieve a better surface finish on the impregnated lace. The tube used may be of any suitable length but we have found a tube having a length within the range 90 cm to 370 cm (approximately 3 feet to 12 feet) particularly convenient to use. Alternatively the impregnated fibres may be passed through the cross-head of an extruder which is heated to the required temperature which depends on the nature of the thermoplastic material. If desired a further coating of thermoplastic may be applied to the outside of the bundle of fibres as it passes through the cross-head.

The impregnated bundle of fibres obtained by the process of the present invention may be chopped and used as granules in conventional injection moulding operations and we have found that the present invention provides a particularly convenient method for producing these granules. In particular the impregnated fibre bundle may be chopped up at room temperature and in fact it is preferable in our process that the hot impregnated roving is cooled, for example, by passing it through a cooling bath such as a water bath before chopping up into granules. Alternatively, the impregnated bundle of fibres may be fed to a heated profiled die to produce a fibre reinforced thermoplastic section or sheet or may be wound onto a mandrel to form sections or removed from the mandrel as a web for pressing into sheet.

Alternatively an impregnated lace may be allowed to fall onto a moving belt, the lace being controlled so as to traverse and to coil on the belt to form a covering which may subsequently be pressed or rolled into sheet. Alternatively the impregnated lace or laces may first be chopped into short e.g. 5 cm lengths before falling onto a moving belt and consolidated into sheet.

The process of the present invention has the added advantage that the machinery or apparatus used for the production of impregnated bundles of fibres is cheap and simple. Furthermore, the apparatus is not subjected to the wear and tear normally experienced when compounding polymers and glass fibres in, for example, a screw extruder.

Figure 2:
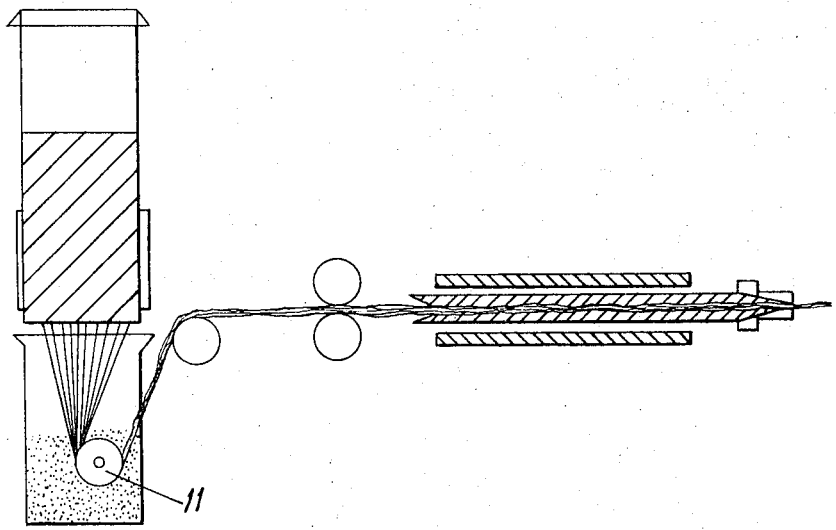

The present invention may be more readily understood by reference to two preferred forms of the apparatus used in the process of the present invention shown schematically in FIGS. 1 and 2 of the accompanying drawings.

In the apparatus illustrated in FIG. 1 molten glass 1 is maintained within a platinum pot 2. The pot is heated by a circular heater 3 which extends round the pot so as to keep the glass at a temperature above its melting point. The bottom of the pot consists of a plate provided with a plurality of holes through which the molten glass will flow in fibrous form. The molten glass extruding through the melt is drawn down and collected as a bundle of fibres 7 by the nip rollers 4.

The glass fibres pass from the pot 2 through a vessel 5 which contains a thermoplastic powder 6 maintained in a fluidised state with nitrogen gas by means not shown. The place where the impregnated fibre bundle 7 leaves the vessel 5 is of course suitably sealed so that free powder particles cannot also pass through in addition to the impregnated fibre bundle.

The vessel 5 is provided with a polymer inlet (not shown) so that polymer 6 may be introduced into the fluidised bed at the same rate as it is being removed as a coating on the glass fibres. The bundle of fibres 7 passes through a tube 8 which is surrounded by a heating jacket 9 where the thermoplastic material is heated to a temperature above its melting point so that it flows to form a matrix surrounding the bundle of fibres. Finally, the impregnated fibre bundle leaves the tube through a die 10 as an impregnated lace.

The apparatus illustrated in FIG. 2 is very similar to that shown in FIG. 1 except the extruded fibres are not drawn together by means of nip rollers outside the vessel 5 but by means of drawing the extruded fibres into the annular groove of a narrow pulley wheel 11 which is rotatably suspended within the fluidised bed of thermoplastic powder. The impregnated bundle of fibres then leaves the vessel 5 through a position near the top of the vessel above the level of the fluidised bed.

I claim:

1. A process for the production of fibre reinforced thermoplastic material comprising extruding a plurality of fibres, passing the fibres into a fluidized bed of powdered thermoplastic material of lower melting point than the fibrous material, converging the fibres such that the fibres are completely drawn together to lodge the powdered material between the fibres while they are in the bed so that they form a bundle which is impregnated with the thermoplastic powder, and heating the impregnated bundle to a temperature above the melting point of the thermoplastic but below the melting point of the fibres.

2. A process according to claim 1, in which the fibres are extruded through a spinneret and the fibres begin to converge immediately on leaving the spinneret and they pass into the bed before the convergence is complete.

3. A process according to claim 1, in which the fibres enter the bed while they are still hot.

4. A process according to claim 1 in which the impregnated bundle, while at a temperature above the melting point of the thermoplastic material, is passed through a die so that the bundle is consolidated into a lace.

5. A process according to claim 1, in which the fibres are glass fibres.

6. A process according to claim 5, in which the bed is fluidised by means of a non-reactive gas and the glass fibre is extruded directly into the non-reactive gas to that the fibres enter the bed before they contact the air.

* * * * *